(12) United States Patent
Chen

(10) Patent No.: US 9,069,191 B1
(45) Date of Patent: Jun. 30, 2015

(54) EYEGLASS STRUCTURE HAVING FLEXIBLE TEMPLES

(71) Applicant: ASWAN INTERNATIONAL CORP., Taipei (TW)

(72) Inventor: Yung-An Chen, Taipei (TW)

(73) Assignee: ASWAN INTERNATIONAL CORP., Taipei (TW)

(*) Notice: Subject to any disclaimer, the term of this patent is extended or adjusted under 35 U.S.C. 154(b) by 14 days.

(21) Appl. No.: 14/164,191

(22) Filed: Jan. 25, 2014

(51) Int. Cl.
G02C 5/16 (2006.01)
G02C 5/14 (2006.01)
G02C 3/00 (2006.01)

(52) U.S. Cl.
CPC G02C 5/16 (2013.01); G02C 5/143 (2013.01); G02C 3/003 (2013.01)

(58) Field of Classification Search
CPC .......... G02C 5/14; G02C 5/143; G02C 5/146; G02C 5/16; G02C 5/18; G02C 5/20; G02C 2200/14; G02C 2200/16; G02C 2200/20

USPC .................. 351/111, 113, 114, 117, 118, 123
See application file for complete search history.

(56) References Cited

U.S. PATENT DOCUMENTS

2006/0256278 A1* 11/2006 Amioka ........................ 351/41
2014/0063440 A1* 3/2014 Butler .......................... 351/114

* cited by examiner

*Primary Examiner* — Huy K Mai
(74) *Attorney, Agent, or Firm* — Li&Cai Intellectual Property (USA) Office

(57) ABSTRACT

The present disclosure provides an eyeglass structure having flexible temples, comprising: a main body; and two flexible plastic temples respective connected at two ends of the main body. The two flexible plastic temples each have a front portion proximal to the main body and a rear portion extending from the respective front portion. The degree of flexibility of the rear portions is greater than that of the front portions. The rear portions can be bent to from a support structure for the ear portion of a user. By this configuration the conformity and comfort of the eyeglass structure is improved.

10 Claims, 7 Drawing Sheets

EYEGLASS STRUCTURE HAVING FLEXIBLE TEMPLES

BACKGROUND OF THE INVENTION

1. Field of the Invention

The present disclosure relates to an eyeglass structure; in particular to an eyeglass structure having flexible temples.

2. Description of Related Art

With the advancement of computing devices, daily lives and work has become more convenient. However, these computing devices damage the eyes, and in addition to effects of the environment, more people are having problems with eyesight, such that eyeglasses have become necessary tools in their lives. Given that eyeglasses are tools users come directly in contact with, the comfort and fitness of eyeglasses are very important. The temples to be worn on the ears of users are in particular an important factor affecting the level of comfort.

In order to increase the comfort for users, the structure and material of the temples of typical eyeglasses are chosen to reduce the overall weight. Therefore the structures of most temples use a plastic layer to enclose a metal strip to form temples that are light weight and flexible. Of the metals, titanium is the most suitable material, so many temples of eyeglasses are made of titanium.

However, given that the usage of titanium greatly increases the production of the eyeglasses, and in order to prevent an overly thick plastic layer from affecting the flexibility of the metal strip, the temples produced are slim and light such that when being worn, the temples are easily displaced or detached due to movements of the user or external collisions. Moreover, the temples cannot securely adhere to the ear portion of the user, possibly leading sliding of the hard plastic layer and friction between the temples and the ear portion of the user, damaging the skin of the ear portion or affects the focus between the lenses and the eyes of the user, which creates dizziness and discomfort.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide an eyeglass structure having flexible temples, wherein by using flexible temples having structural units of different properties, the overall conformity of the eyeglass structure is increased and the comfort is improved for the user wearing the eyeglass structure.

In order to achieve the aforementioned objects, the present disclosure provides an eyeglass structure having flexible temples including a main frame and two flexible plastic temples connected respectively at two ends of the main frame, wherein each of the two flexible plastic temples has a front portion proximal to the main frame and a rear portion extending from the front portion, the degree of flexibility of the rear portions is greater than that of the front portions, and the rear portions can be bent with respect to the front portions to form support structures corresponding to the ear portions of the user.

In summary of the above, the present disclosure has the following advantageous effects. The flexible plastic temples of the present disclosure are each formed by two portions having different flexibilities. The rear portion of each of the flexible plastic temples is a flexible structure having high frictional force and adheres to the skin. Through the high frictional force and adherence to the skin of the rear portions, the conformity between the flexible plastic temples and the ear portions of the user and the level of comfort are increased. Sliding is reduced, thereby avoiding rubbing between the flexible plastic temples and the skin which damages or irritates the skin. Moreover, the user can bend the rear portions of the flexible plastic temples at will, adjusting the same according to practical needs. The front portions are relatively inflexible with respect to the rear portions. However, the front portions have more stability, are stronger and are more resilient to collisions, such that the main frame does not shake or become damaged during use.

Overall, during collisions, the rear portions which have excellent flexibility act as buffer for absorbing most of the colliding force. The front portions have preferred structural rigidity, preventing the flexible plastic temples from fracturing or being damaged from collisions, and protecting the eye portion of the user from collisions. Therefore the flexible plastic temples of the present disclosure provide preferred conformity of the eyeglass structure and more comfort for the user.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Figure 1:
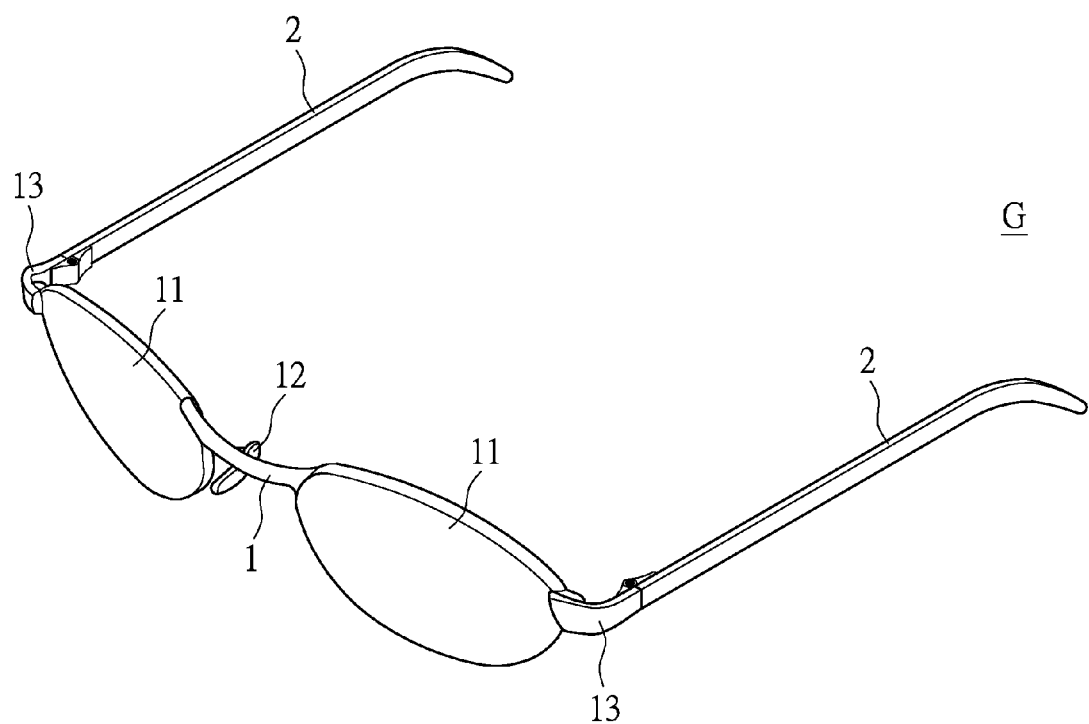
FIG. 1 shows a schematic diagram of an assembled eyeglass structure having flexible temples according to a first embodiment of the present disclosure.
Figure 2:
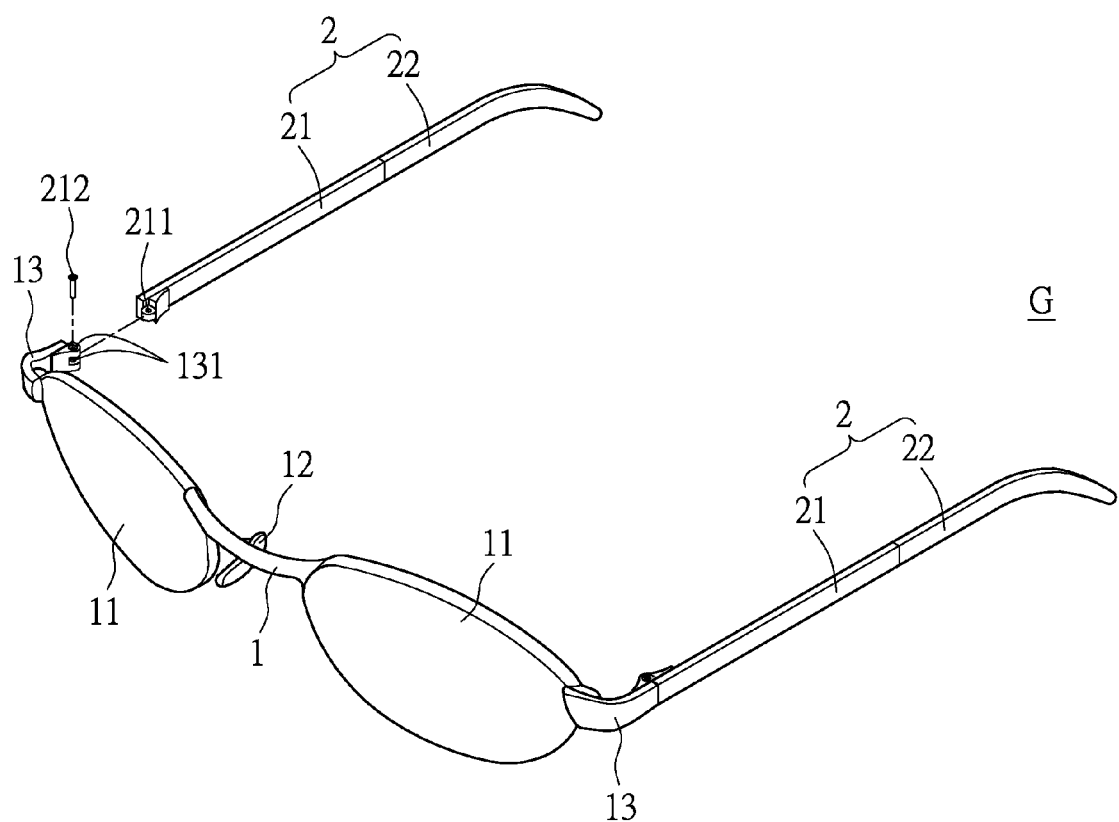
FIG. 2 shows an exploded view of an eyeglass structure having flexible temples according to a first embodiment of the present disclosure.

FIG. 1 shows a schematic diagram of an assembled eyeglass structure having flexible temples according to a first embodiment of the present disclosure. FIG. 2 shows an exploded view of an eyeglass structure having flexible temples according to a first embodiment of the present disclosure.

According to the present disclosure, the eyeglass structure G having flexible temples can be a frameless eyeglass structure, a framed eyeglass structure or other common types of eyeglasses including but not limited to sunglasses, safety goggles, etc. In the present embodiment the eyeglass structure G is a frameless eyeglass structure, including: a main body 1 and two flexible plastic temples 2.

Specifically, the main body 1 includes lenses 11, two nose pads 12 and two connection units 13. The two nose pads 12 are attached at the center of the main body 1. The two connection units 13 are respectively fixed at the two ends of the main body 1, and are respectively connected to the lenses 11 and respectively connected to the flexible plastic temples 2. Each of the connection units 13 is formed with a first pivot structure 131.

Each of the two flexible plastic temples 2 is partitioned into a front portion 21 connected to the respective connection units 13 and a rear portion 22 extending from the respective front portion 21. A second pivot structure 211 protrudes from each of the front portions 21 for cooperation with the respective first pivot structure 131, to pivotally connect the flexible plastic temples 2 respectively to two ends of the main body 1.

Of particular note, the front portion 21 and the rear portion 22 of each of the flexible plastic temples 2 have different thicknesses. The flexibility of the rear portions 22 is greater than the flexibility of the front portions 21. The rear portions 22 can be bent to form a support structure conforming to the ear portions of the user. In other words, the rear portions 22 have the property of not holding their shapes after being bent. Taking advantage of this property, the user can adjust the shapes of the rear portions 22 at will according to practical needs, to satisfy the level of desired adherence of the temples when worn on the user. Additionally, the relative dimensions and lengths of the front portions 21 and the rear portions 22 are not limited to what is shown in FIG. 2.

As shown in FIG. 2, in the present embodiment, each of the first pivot structure 131 has an upper fixture hole and a lower fixture hole spaced apart. Each of the second pivot structure 211 has an engagement hole for engagement with the two respective fixture holes. However, the quantities of the holes can be modified according to practical need and are not limited thereto.

When assembling the present embodiment, each of the second pivot structures 211 is sandwiched by the respective first pivot structure 131, the fixture holes are aligned with the engagement hole, and then a pivot shaft 212 is inserted into the holes such that the flexible plastic temples 2 are respectively pivotally connected to the connection units 13. Additionally, besides the aforementioned method of assembly, other methods such as fitting or locking can be used to pivotally connect the flexible plastic temples 2 at two ends of the main body 1 such that the two flexible plastic temples 2 can freely open and close upon the main body 1.

Specifically, the two flexible plastic temples 2 can be formed by injection molding of flexible polymer plastic. The flexible polymer plastic is filled in a mold, and the front portion 21 and the rear portion 22 of the flexible plastic temple 2 is integrally formed as one body by injection molding. The flexible polymer plastic can be but is not limited to polybutylene terephthalate (PBT), polypropylene (PP), nylon, styrene-butadiene copolymer (SBC), or styrene-butadiene-styrene copolymer (SBS).

In the present embodiment, the two flexible plastic temples 2 are made of styrene-butadiene-styrene copolymer (SBS), which is a thermal plastic elastomer (TPE). TPE is formed by particular arrangement of styrene with butadiene, forming blocks of polystyrene and polybutadiene in three dimensional polymer chains. Good frictional force, stretching ability and flexibility is provided, and the material does not fracture easily and is similar to the texture of fatty pads on a foot of a person. Therefore, TPE is a material which is close to the skin and does not cause problems of skin allergy.

Specifically, the TPE material can be adjusted such that the flexibility of the rear portions 22 is greater than the flexibility of the front portions 21. When producing the flexible plastic temples 2, the TPE material of the front portions 21 has a higher content of styrene, such that the front portions 21 is less flexible than the rear portions 22.

The front portions 21 are the portions of the flexible plastic temples 2 connected to the main body 1. Therefore, by increasing stability of the front portions 21, shaking or damage to the main body 1 is reduced. The rear portions hanging on the ear portions of the user touching the skin has the properties of high frictional force and being close to the skin. The high frictional force of the rear portions 22 reduces sliding, preventing damage or irritation of the skin due to rubbing between the flexible plastic temples 2 and the ear portions, and greater comfort is provided for the user.

Second Embodiment

Figure 3:
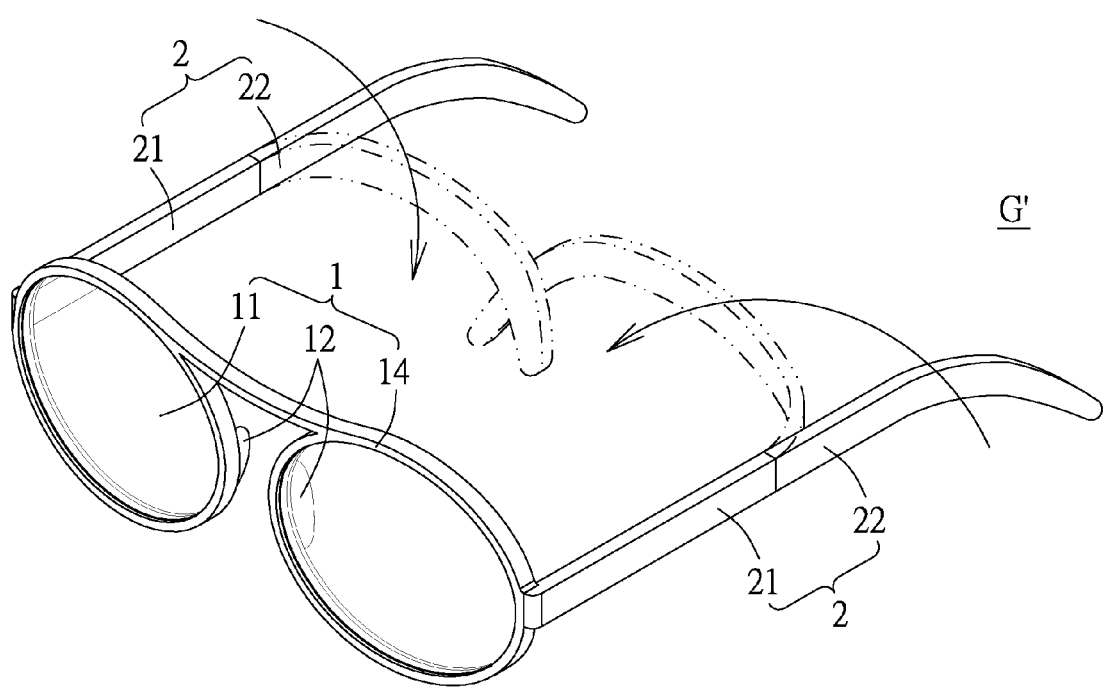
FIG. 3 shows a schematic diagram of a schematic diagram of an eyeglass structure having flexible temples according to a second embodiment of the present disclosure.

FIG. 3 shows a schematic diagram of a schematic diagram of an eyeglass structure G' having flexible temples according to a second embodiment of the present disclosure. The difference between the present embodiment and the first embodiment lies in that the main body 1 further comprises a frame 14. Namely, the eyeglass structure G' is a framed eyeglass structure. As shown in FIG. 3, the two flexible plastic temples 2 and the frame 14 of the present embodiment can be integrally formed as one body, such that the two flexible plastic temples 2 are connected at two ends of the main body 1.

The material of the frame 14 can be the same as the material of the front portions 21 of the flexible plastic temples 2, and the front portions 21 and the frame 14 can be integrally formed as one body by injection molding for further increasing the overall stability of the eyeglass structure. The rear portions 22 of the flexible plastic temples 2 have preferred flexibility and can be bent at will. The rear portions 22 can be bent to adjust to needs of the user. Specifically, as shown in FIG. 3, if the user moves when wearing the eyeglass structure, the rear portions 22 of the flexible plastic temples 2 can be bent inward to adhere more to the ear portions of the user. Alternately, the rear portions 22 can be bent to hook the ear portions of the user to reduce shaking.

However, the material of the frame 14 is not limited hereto, and can be the same material of the rear portions 22, or other polymer plastic, metal, metal alloys, etc. and can be adjusted according to need.

Third Embodiment

Figure 4:
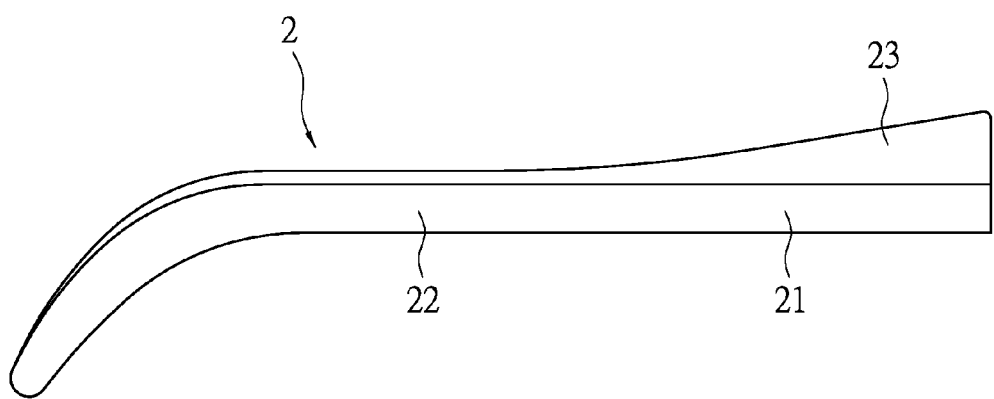
FIG. 4 shows a schematic diagram of a flexible plastic temple according to a third embodiment of the present disclosure.

FIG. 4 shows a schematic diagram of a flexible plastic temple according to a third embodiment of the present disclosure. The present embodiment differs from the first and second embodiments in that the flexible plastic temples 2 each include at least one flexible unit 23.

Specifically, the flexible units 23 can be made of the aforementioned flexible polymer plastic, and cover at least the front portions 21 or the rear portions 22 of the flexible plastic temples 2. In the present embodiment, each of the flexible temples 2 covers the respective front portion 21 and the respective rear portion 22, and the thickness of the flexible unit 23 gradually reduces from the front portion 21 to the rear portion 22. The two flexible plastic temples 2 are made of TPE material, and the flexible units 23 is made of styrene-butadiene copolymer SBC), but is not limited thereto.

The following briefly describes the styrene-butadiene copolymer (SBC). The plastic is transparent resin, commonly known as K plastic, K resin or Q resin (referred to as K plastic in the following). K plastic, compared to other transparent copolymers, has the following properties: (1) clear, transparent and bright like glass, high rigidity, resistance to impact, resistance to fracture, and c\resilience can be increased by adjusting the content of butadiene. (2) The amount of styrene and butadiene can be adjusted to balance the rigidity and resilience of the product. (3) K plastic is organically compatible and not poisonous. (4) K plastic is resistant to piercing, can be printed on, is highly contractable, and is permeable to water and air (oxygen or carbon dioxide). (5) K plastic can be injected at high volumes, has short processing periods of injection and heat molding, and has good qualities of heat molding, such that production rate is high. Additionally, the density of the K plastic is low, so the production cost can be lowered.

Therefore, the flexible units 23 area each a transparent structure having lower flexibility relative to the flexible plastic temples 2. By forming the flexible units 23 on the flexible plastic temples 2 (as shown in FIG. 4) or on any side surfaces of the flexible plastic temples, and making the thickness of the flexible units 23 to be greater at the front portions 21 than at the rear portions 22, the stability, resistance to impact and resistance to fracture of the front portions 21 of the flexible plastic temples 2 are improved.

In a modified embodiment, the front portions 21 of the temples 2 can be each formed by a flexible unit 23. By this method, flexible plastic temples 2 having different structural properties at the front and rear portions are formed. Namely, the front portions 21 are highly stable structures, and the rear portions 22 have more flexibility.

In another modified embodiment, the front portions 21 of the flexible plastic temples 2 can partially include the flexible units 23. Specifically, when forming a flexible plastic temple 2, the front portion 21 is formed by filling in a specific proportion of original material and a flexible unit 23 in the mold, such that the front portions 21 is formed by two structures having different properties.

Fourth Embodiment

Figure 5A:
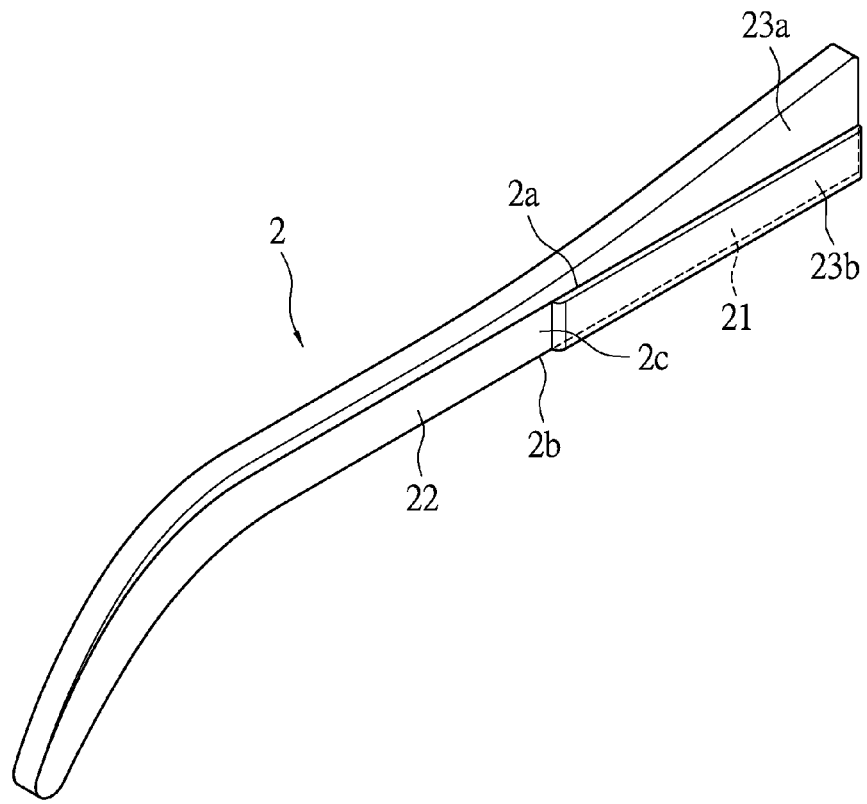
FIG. 5A and FIG. 5B show schematic diagrams of a flexible plastic temple according to a fourth embodiment of the present disclosure.
Figure 5B:
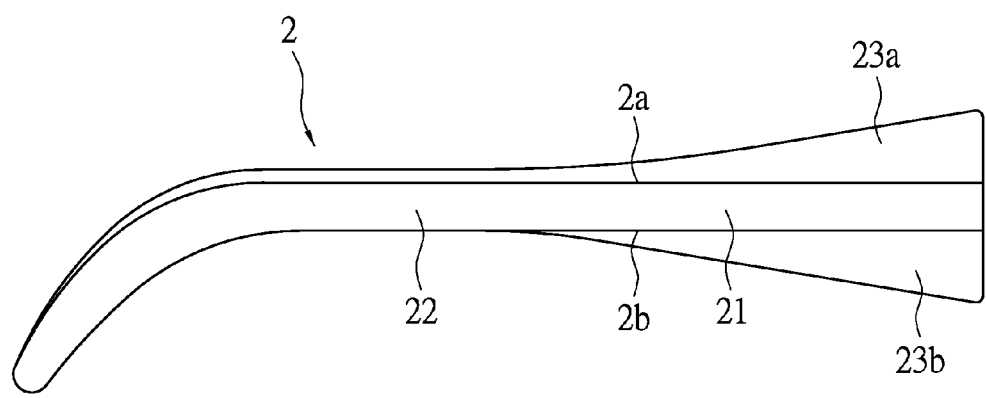

FIG. 5A and FIG. 5B show schematic diagrams of a flexible plastic temple according to a fourth embodiment of the present disclosure. To facilitate description, define an upper surface 2a and a lower surface 2b are defined on each of the flexible plastic temples 2, and two side faces 2c, 2d are adjacent to the upper surface 2a and the lower surface 2b. However, these definitions do not limit the shape of the flexible plastic temples 2. The present embodiment differs from the third embodiment in that each of the flexible plastic temples 2 includes a first flexible unit 23a and a second flexible unit 23b. The first flexible unit 23a and the second flexible unit 23b are made of the same or different flexible polymer plastics.

Specifically, the first flexible unit 23a and the second flexible unit 23b can respectively cover one of the upper surface 2a and the lower surface 2b of the flexible plastic temple 2, and one of the side faces 2c, 2d (not labeled in the figure) of the flexible plastic temple 2. In the present embodiment, the first and second flexible units 23a, 23b are both made of K plastic. The first flexible plastic unit 23a is formed at the upper surface 2a of the flexible plastic temple 2. The thickness of the first flexible unit 23a gradually decreases from the front portion 21 to the rear portion 22, but is not limited thereto. The second flexible unit 23b is formed at the side face 2c neighboring the first flexible unit 23a (as shown in FIG. 5A), or at the lower surface 2b) opposite the first flexible unit 23a (as shown in FIG. 5B). By this method, stability of the front portion 21 of the flexible plastic temple is increased by the second flexible unit 23b.

Fifth Embodiment

Figure 6A:
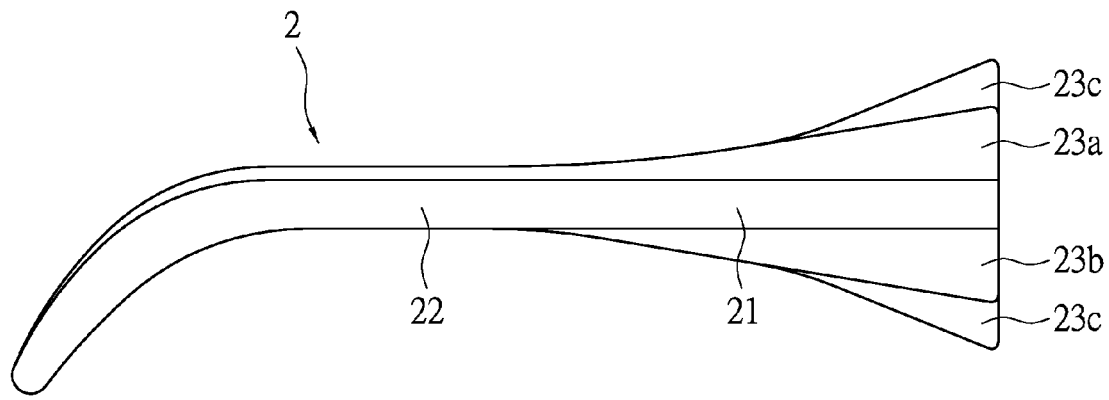
FIG. 6A shows a schematic diagram of a flexible plastic temple according to a fifth embodiment of the present disclosure.
Figure 6B:
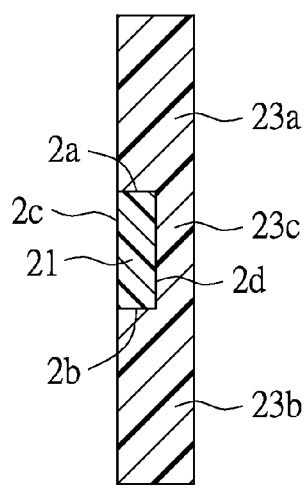
FIG. 6B shows a side view of a flexible plastic temple according to a fifth embodiment of the present disclosure.

FIG. 6A shows a schematic diagram of a flexible plastic temple 2 according to a fifth embodiment of the present disclosure. FIG. 6B shows a side view of a flexible plastic temple 2 according to a fifth embodiment of the present disclosure. The present embodiment differs from the fourth embodiment in that each of the flexible plastic temples 2 can further include a third flexible unit 23c, covering at least one of the first flexible unit 23a. The third flexible unit 23c can be made of the same or different flexible polymer plastics as the first and second flexible units 23a, 23b.

As shown in FIG. 6A, the third flexible unit 23c is formed on the first and second flexible units 23a, 23b, forming a structure having layers of units of different properties. However, the configuration is not limited to the above, and in another embodiment the third flexible unit 23c can be formed according to need at the top and bottom surfaces 2a, 2b, or on the two side faces 2c, 2d.

Specifically, as shown in FIG. 6B, the first flexible unit 23a, the second flexible unit 23b and the third flexible unit 23c are integrally formed as one body. When forming the flexible plastic temple 2 during injection molding, the first flexible units 23a, the second flexible unit 23b and the third flexible unit 23c together form a structure having a groove, and the front portion 21 of the flexible plastic temple 2 can be formed in the groove such that the first flexible unit 23a, the second flexible unit 23b and the third flexible unit 23c cover the upper surface 2a, the lower surface 2b and a side surface 2d of the flexible plastic temple 2. In other words, the first flexible unit 23a, the second flexible unit 23b and the third flexible unit 23c partially cover the front portion 21, thereby achieving the effect of better stability. However, the present disclosure is not limited thereto, and can partially or completely at least one of the front portion 21 and the rear portion 22 of the flexible plastic temple 2 with at least one flexible unit 23.

Figure 7:
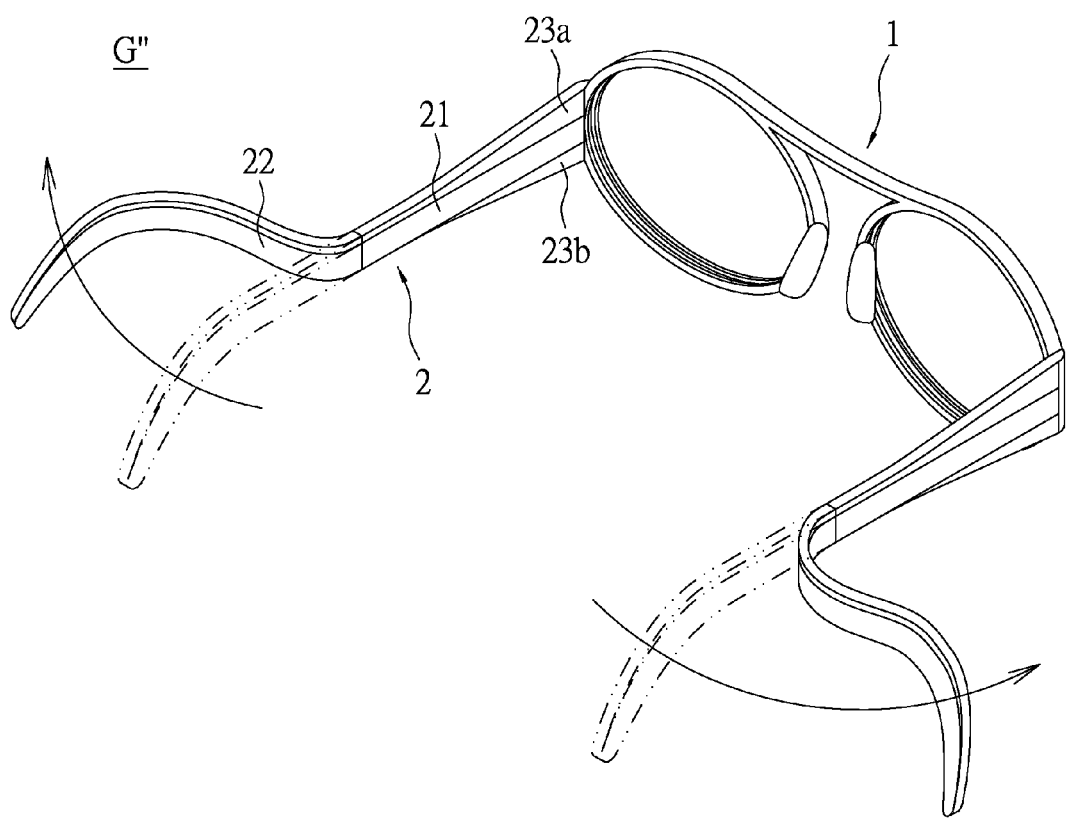
FIG. 7 shows implementation of an eyeglass structure having flexible temples according to the present disclosure.

FIG. 7 shows implementation of an eyeglass structure G" having flexible temples according to the present disclosure. Through a difference in flexibility in the structure of the flexible plastic temple 2, namely a greater flexibility of the rear portion 22 than the flexibility of the front portion 21 of the flexible plastic temple 2, when the flexible plastic temple 2 is collided by an outside force, the more flexible rear portion 22 bends to absorb the outside force, and can be restored to the original state by adjustment from the user. Moreover, due to preferred stability, resistance to impact and resistance to fracture of the front portion 21, the flexible plastic temple 2 is not easily fractured, damaged or deformed due to outside forces. Flexible units having different structural properties can increase the strength and width of the front portion 21 of the flexible plastic temple 2, preventing the eye portion of the user from being subject to damage by side collisions.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. An eyeglass structure having flexible temples, comprising:
   a main body; and
   two flexible plastic temples, respectively connected at two ends of the main body, wherein the two flexible plastic temples each have a front portion proximal to the main body and a rear portion extending from the front portion, the degree of flexibility of the rear portion is greater than the degree of flexibility of the front portion, and the rear portions are bendable for forming a pair of support structure of ear portions of a user.

2. The eyeglass structure having flexible temples according to claim 1, wherein the thickness of the front portions and the thickness of the rear portions are different.

3. The eyeglass structure having flexible temples according to claim 2, wherein the main body includes a frame integrally formed as one body with the two flexible plastic temples.

4. The eyeglass structure having flexible temples according to claim 2, wherein two ends of the main body each have a first pivot structure, the front end of each of the two flexible plastic temples has a second pivot structure for engagement with the respective first pivot structure.

5. The eyeglass structure having flexible temples according to claim 2, wherein the two flexible plastic temples each include at least one flexible unit covering at least one of the front portion or the rear portion respective flexible plastic temple.

6. The eyeglass structure having flexible temples according to claim 5, wherein the two flexible plastic temples each have an upper surface, a lower surface, and two side faces adjacent to the upper surface and the lower surface, the two flexible plastic temples each include a first flexible unit and a second flexible unit, each of the first flexible units cover the respective upper surface, and each of the second flexible units covers at least one portion selected from the group consisting of the respective front portion and the respective rear portion.

7. The eyeglass structure having flexible temples according to claim 6, wherein the two flexible plastic temples each includes a third flexible unit covering at least one portion selected from the group consisting of the respective first flexible unit and the second flexible unit.

8. The eyeglass structure having flexible temples according to claim 7, wherein each of the first flexible unit, each of the second flexible unit and each of the third flexible unit respectively cover one of the upper surfaces, one of the lower surfaces, and one of the side surfaces.

9. The eyeglass structure having flexible temples according to claim 6, wherein the flexible units are integrally formed as one body and partially cover the flexible plastic temples.

10. The eyeglass structure having flexible temples according to claim 6, wherein the flexible units are integrally formed as one body and completely cover the flexible plastic temples.

* * * * *